United States Patent [19]

Braun

[11] Patent Number: 4,638,898
[45] Date of Patent: Jan. 27, 1987

[54] CLUTCH CONTROL SYSTEM AND CLUTCH ASSEMBLY USING SAME

[75] Inventor: Eugene R. Braun, Royal Oak, Mich.

[73] Assignee: Eaton Corporation, Cleveland, Ohio

[21] Appl. No.: 810,618

[22] Filed: Dec. 19, 1985

[51] Int. Cl.$^4$ .............................................. B60K 41/28
[52] U.S. Cl. .............................. 192/0.052; 192/0.076; 192/0.092
[58] Field of Search ............... 192/0.052, 0.076, 0.075, 192/0.092, 0.032, 0.033, 3.58, 103 C, 103 R; 74/752 D; 361/242

[56] References Cited

U.S. PATENT DOCUMENTS

| | | | |
|---|---|---|---|
| 3,004,447 | 10/1961 | Sand | 74/752 C X |
| 3,752,284 | 8/1973 | Brittain et al. | 192/0.052 X |
| 3,942,393 | 3/1976 | Forster et al. | 192/103 C X |
| 4,081,065 | 3/1978 | Smyth et al. | 192/0.076 |
| 4,413,714 | 11/1983 | Windsor | 192/0.033 |
| 4,425,992 | 1/1984 | Makita | 192/0.076 X |
| 4,432,445 | 2/1984 | Windsor | 192/0.076 |
| 4,487,303 | 12/1984 | Boveri et al. | 192/0.052 |

*Primary Examiner*—George H. Krizmanich
*Attorney, Agent, or Firm*—D. A. Rowe; A. E. Chrow

[57] ABSTRACT

A clutch control system and clutch assembly utilizing same includes a comparator (10) for receiving a signal (A) corresponding to actual engine speed from a sensor member (6) and a signal (D) corresponding to desired engine speed from a sensor member (8) to provide an output signal (A−D). Signal (A−D) is provided to a summer (16) as well as a differentiator (14) which operates upon (A−D) to provide the differential with respect to time $$\frac{d(A-D)}{dt}$$

which is received by summer (16) which provides the function signal $$(A-D) + \frac{d(A-D)}{dt}$$

to an actuator (2) which utilizes the functional signal to control clutch (4). The functional signal may also include one or more weighting factors such as ($K_1$) to control the magnitude of signals (A) and/or (D) and/or (A−d) and/or $$\frac{d(A-D)}{dt}$$

in the manner desired.

39 Claims, 3 Drawing Figures

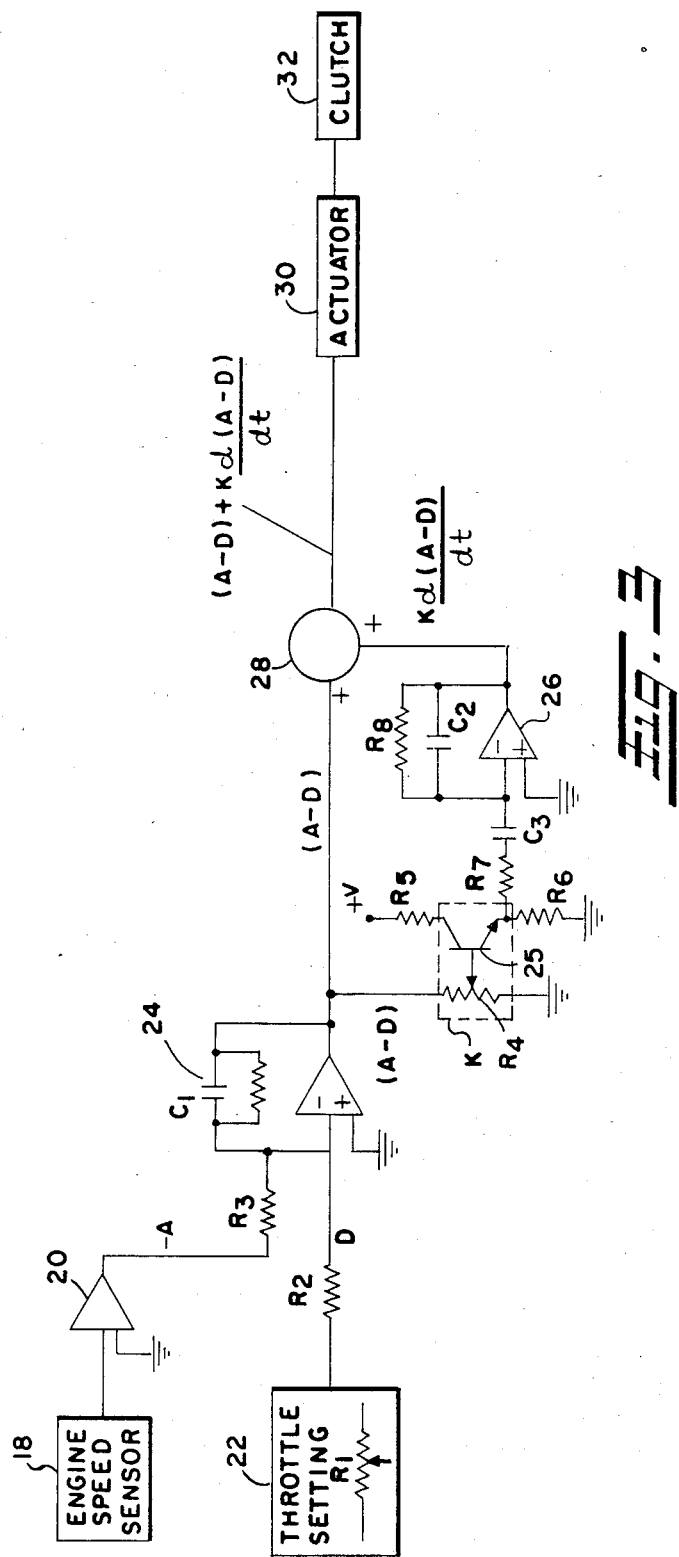

CLUTCH CONTROL SYSTEM AND CLUTCH ASSEMBLY USING SAME

INTRODUCTION

This invention relates generally to a clutch control system for controlling engagement between a driven member of a clutch assembly and a driver member of an engine and more particularly to a clutch control system that is operative to automatically effect the rate of engagement between the driven and driver members during the period in which the engine is changing from an actual speed to a desired speed according to a function signal generally represented by the equation:

$$F = (A-D) + \frac{d(A-D)}{dt}$$

where
D=desired engine speed
A=actual engine speed $\frac{d(A-D)}{dt}$ = rate of change of the difference between the actual and desired engine speeds with respect to time.

BACKGROUND OF THE INVENTION

Clutch assemblies have been used for many years for engaging a vehicular transmission with an engine crankshaft to provide selected transmission gear ratios at preselected speed ranges for effective movement of the vehicle particularly under load.

One of the problems, however, particularly in heavy duty truck applications, has been regulating the rate at which the engagement occurs i.e. abruptly or in a smooth controlled manner of which the former is highly undesirable due to impact shock and undue damage and wear on the clutch plate as well as other parts of the transmission and drive train.

In view of the foregoing, considerable attention has been given in the past to controlling the rate at which the clutch plate engages the engine crankshaft so as to minimize shock load, damage and wear.

One of the ways utilized in the past for controlling the rate of engagement has been to control the actuator (characteristically a linear actuator) that actually effects the engagement with a control signal that progressively diminishes as the actual engine speed approaches a desired engine speed so as to progressively decrease the rate of movement of the clutch plate as it moves towards the engine crankshaft driver plate. This type of control, however, is not entirely satisfactory for it does not compensate for how fast the actual engine speed approaches a desired engine speed.

An early example of a hydraulic transmission control device for controlling the rate of engagement according to correlation between the engine speed and throttle position further including means for detecting variations in the rate of change in engine speed from a predetermined desired rate is disclosed in U.S. Pat. No. 3,004,447, the disclosure of which is incorporated herein by reference.

An example of an electronic clutch control which utilizes differences between clutch output speed and input speed in addition to acceleration of input speed to control rate of clutch engagement is disclosed in U.S. Pat. No. 3,752,284, the disclosure of which is incorporated herein by reference.

U.S. Pat. No. 4,081,065, the disclosure of which is incorporated herein by reference, discloses an electrically controlled power clutch that is operative to control the rate of engagement according to an error signal "E" received by the actuator where $$E = (N - A) + K\frac{dn}{dt}$$

where
N=actual engine speed
A=desired engine speed
K=a weighting factor and $\frac{dn}{dt}$ = acceleration of the engine The desired engine speed is varied with the throttle pedal position so if the operator applies full throttle indicating a need for maximum starting torque, the desired engine speed is set near the peak torque of the engine. A light throttle position indicates a desire for slow maneuvering speed so the desired engine speed is set low. However, this control is deficient since it does not include the time rate of change of the desired engine speed to modify the clutch engagement.

An example of electrical clutch control systems that utilize an engine speed signal and two reference signals for controlling clutch engagement is respectively disclosed in U.S. Pat. Nos. 4,413,714 and 4,432,445, the disclosures of both of which are incorporated herein by reference.

All of the above however use either the error signal corresponding to the difference between actual engine speed and desired engine speed singularly or in conjunction with an acceleration term concerning acceleration of the engine or clutch plate and/or two or more additional reference signals for providing their clutch engagement rate control systems with the latter requiring the cost and expense of requiring additional sensors to provide the required information which, in itself, leads to higher probability of inaccuracies due to non-linearity or other quality problems associated with sensors in general.

Suitable vehicle starting depends upon the value of a number of factors and their time rate of change. By letting these factors modify the desired engine speed and including the influence of their time rate of change by including the time rate of change of the difference between the desired engine speed and actual engine speed a simpler improved clutch engagement control is attained.

SUMMARY OF THE INVENTION

Accordingly, it is an object of this invention to provide a clutch control system that is automatically able to provide smooth engagement between the driven member of a clutch assembly and the driver member of an engine to minimize impact and wear.

It is a further object of this invention to provide a clutch control system that is able to control the rate of engagement between the driven member of a clutch assembly and the driver member of an engine in a manner effective to minimize impact and wear.

It is a further object of this invention to provide a clutch control system and clutch assembly utilizing same that is able to control the rate of engagement between the driven member of the clutch assembly and the driver member of an engine in a manner effective to minimize impact shock and wear by controlling the rate of engagement by a function signal predicated upon the difference between actual and desired engine speeds and the time rate of change of the difference.

BRIEF DESCRIPTION OF THE DRAWINGS

FIG. 3 shows one embodiment of an electrical circuit suitable for providing the control system of the invention.

DESCRIPTION OF THE SOME PREFERRED EMBODIMENTS

Figure 1:
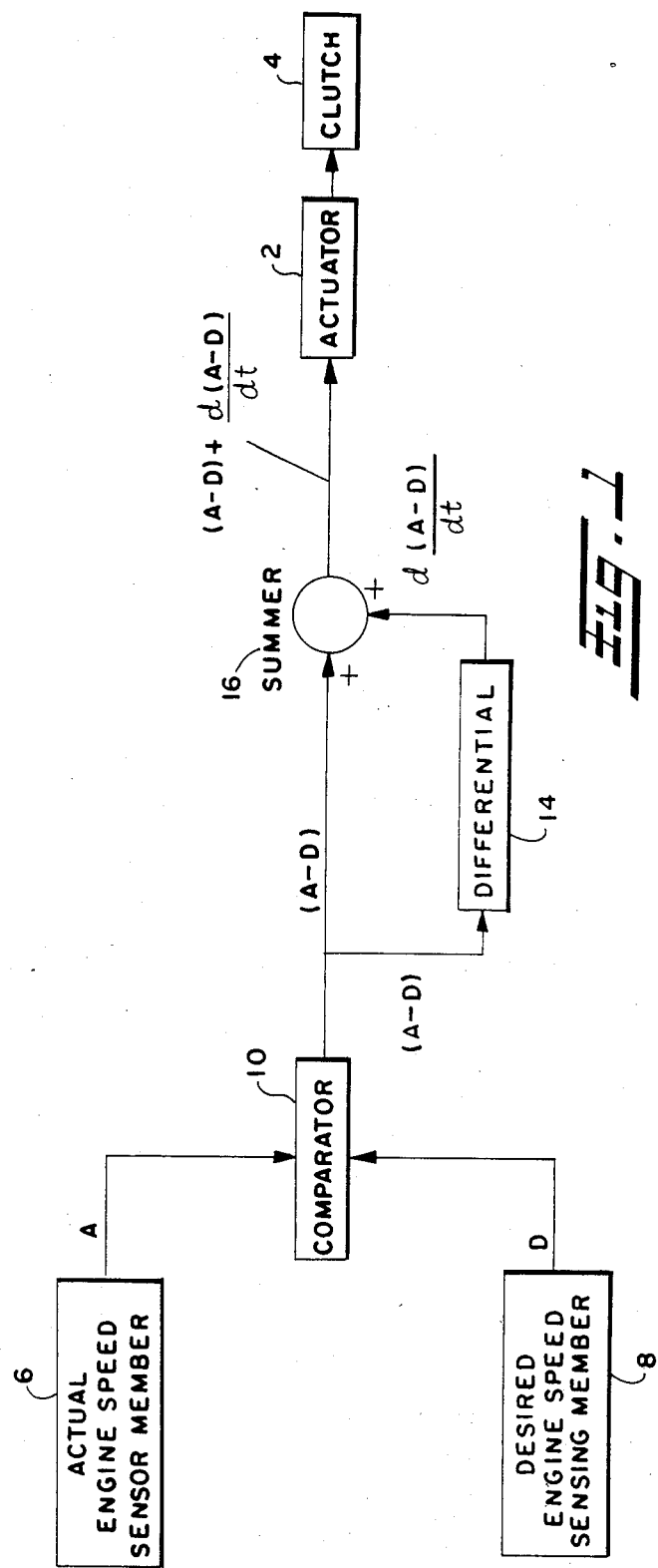
FIG. 1 shows a block diagram of an embodiment of the control system of the invention.

FIG. 1 shows a generalized block diagram of the control system of the invention operative to control an actuator 2 in a manner enabling control of the rate at which the driven member of clutch assembly 4 engages the driver member, such as a crankshaft, of an engine (not shown). Actuator 2 is commonly a linear actuator that includes a motor, commonly a D.C. motor, that controls linear movement of the actuator in a manner determined by the nature of an electrical signal received by the motor.

Generally, the control system of the invention includes a first actual engine speed sensor member 6, such as as a magnetic pick-up device, that is operative with suitable electrical circuitry to provide a first output signal A corresponding to actual engine speed.

The control system of the invention also includes a second desired engine speed sensor member 8 that is connected to a control device such as an adjustable accelerator pedal, that is operative to adjust desired engine speed. Sensor member 8 provides a second output signal "D" corresponding to the desired engine speed. Such signal is commonly provided by a variable potentiometer connected to the pedal.

Signals A and D are received by comparator 10 which is operative to provide the difference signal (A−D) which is then delivered both to summer 16 and to a differentiator 14. Differentiator 14 may be any device suitable for providing an output signal $$\frac{d(A-D)}{dt}$$

in response to receipt of an input signal (A−D).

Generally signal (A−D) is termed an "error signal" and $$\frac{d(A-D)}{dt}$$

in the change in error signal (A−D) with respect to time.

Figure 2:
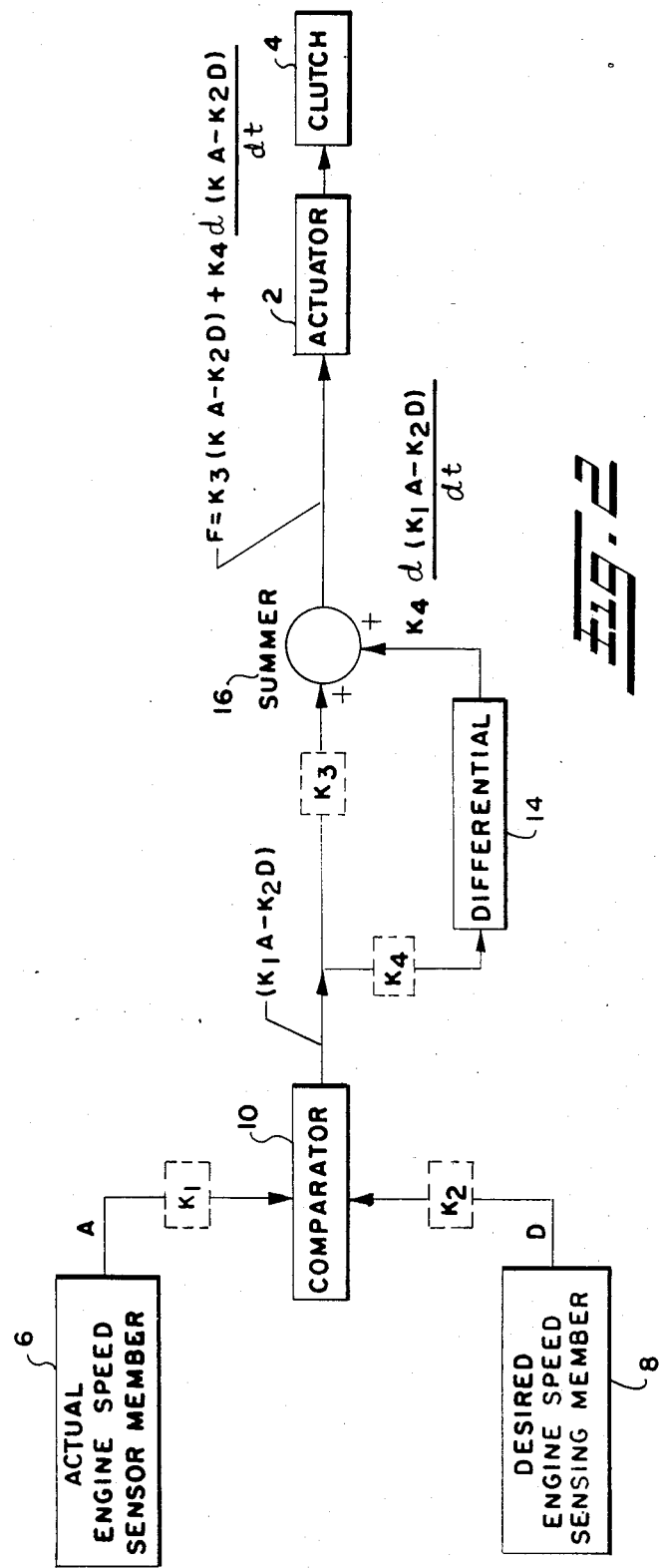
FIG. 2 shows an embodiment of the block diagram of FIG. 1 further including one or more weighting factors.

The control system of the invention may, where desired, include one or more weighting factors generally referred to as "K" for controlling the magnitude of signals A and D and the difference therebetween such as for example as expressed by the following equation and shown in FIG. 2:

$$F = K_3(K_1A - K_2D) + K_4 \frac{d(K_1A - K_2D)}{dt}$$

Where any one or more of weighting factors $K_1$-$K_4$ may be unity. The weighting factors may for example be provided by a variable resistor such as resistor R4 in combination with a switching thyristor 25 shown in FIG. 3. The inclusion of weighting factors provides the advantage of enabling adjustment in the magnitude of either or both signals A and D and/or the difference therebetween which can be used to advantage by providing adjustment to the weight to the differentiated portion of the function signal. Any one of factors $K_1$-$K_4$ can, of course, be adjusted to provide unity or be eliminated completely where suitable or additional weighting factors may be included in the function signal where desired.

Broadly then, the control means of the clutch control system of the invention may include means for providing at least one weighting factor for controlling the magnitude of the least one of the first and second signals and/or the difference therebetween preferably at least when the difference is differentiated with respect to time.

In FIG. 2, the signals $K_3(K_1A-K_2D)$ and $K_4 d(K_1A_t-K_2D)$ are received by summer 16 which is operative to sum the two to provide the output function signal which is received by actuator 2 which is operative to control the rate of engagement of clutch assembly 4 in the manner prescribed by the function signal.

Conceptually, when the throttle position of the engine is changed, the initial condition is expressed by the signal (A−D) with A then approaching D over a finite period of time such that the quantity (A−D) and the quantity $$\frac{d(A-D)}{dt}$$

both approach zero as signals A and D finally coincide. Thus, with the function signal approaching zero over a finite period of time, the control system actually acts as a dampening system by progressively slowing the rate at which the clutch engagement is made.

One of the advantages of the control system of the invention is that it operates only upon the error signal (A−D) and its differential with respect to time which is highly accurate by limiting its operation only upon the error signal in the manner herein described.

Another advantage of the control system of the invention is that by operating on the time rate of change of the error signal (A−D) which is $$\frac{d(A-D)}{dt},$$

the rate of engagement of the clutch responds to the time rate of changing conditions which modify D, the desired engine speed.

The desired engine speed D may be modified by a microprocessor control responsive to various conditions according to predetermined formula or relationships to vary the rate of clutch engagement to eliminate undesirable impact shock and undue damage and wear on the clutch as well as other parts of the drivetrain.

For smooth starts, the clutch rate of engagement should be slow until backlash has been taken out of the vehicle's drivetrain. This may be accomplished by keeping the desired engine speed near the actual engine speed until the clutch driven member rotates thus indicating the vehicle is moving. The clutch torque and rate of clutch engagement torque are multiplied by the transmission gear ratio so with lower gear ratios and more torque multiplication, it is advisable for smooth starts to have a slower rate of clutch engagement which can be accomplished by having lower desired engine speed in lower gear ratios. Decreasing the clutch slip or the difference between engine driver member and clutch driven member indicates the vehicle is started and is accelerating, so desired engine speed and rate of clutch engagement can be increased for quicker engagement and lower clutch heating.

The clutch slip speed difference between actual engine speed and clutch driven member speed, multiplied by an indication of the clutch torque and summed or integrated over time will give an indication of the total heat generated in the clutch during a vehicle start. In order to prevent heat damage and excessive wear to the clutch, this summation of heat generated may be used to increase the desired engine speed to increase the rate of clutch engagement before heat generated is excessive. The indication of clutch torque can be simply the throttle pedal position or the engine fuel control position or calculated by a microprocessor from engine throttle position and speed minus the torque required to accelerate the engine. Other clutch torque indications are possible within the spirit of the invention.

A further advantage of the control system of the invention is that having the rate of clutch engagement responsive to the time rate of change of the error signal (A−D) there is less overshoot and oscillation of the actual engine speed about the desired engine speed and the vehicle speed change is consequently smoother.

Although the control system of the invention may be either hydraulic or electrical in nature or combinations of the two, it is preferably electrical of which one preferred embodiment of electrical circuit means suitable for control system of the invention is shown in FIG. 3.

In FIG. 3, the resistors $R_1$ through $R_8$ and capacitors $c_1$ through $c_3$ can be selected by means well known to those ordinarily skilled in the art of electrical signal circuitry to provide the magnitude and quality of the output function signal desired.

In addition to including one or more weighting factors for controlling the relative magnitude between actual engine speed and desired engine speed, the clutch control system of the invention includes embodiments where the control means includes means to modify the second signal in a predetermined manner such as by including means to modify the second signal in relationship to the clutch driven member speed as well as means to modify the second signal in relationship to the particular gear ratio engaged in a transmission connected to the clutch driven member and/or where the control means including means to modify the second signal in relationship to the difference between actual engine speed and the clutch driven member speed and/or as previously described, when the control means includes means to modify the second signal in relationship to heat generated in the clutch and/or wherein the control means includes means to modify the second signal in relationship to the difference between the actual engine speed and the clutch driven member speed times the clutch torque indication integrated over time.

In FIG. 3, engine speed sensor 18, such as a magnetic field pick-up and suitable electrical circuitry, provides a voltage signal to amplifier 20 which in turn provides a negative output voltage signal "−A" corresponding to the negative of actual engine speed.

A throttle position sensor member 22, such as a variable rheostat or potentiometer operated by the accelerator pedal provides a voltage signal "D" corresponding to the desired engine speed according to the position of the pedal. Voltage signals "−A" and "D" are received by the summing input terminals of amplifier 24 which provides voltage output signal (A−D) which is delivered both to summing junction 28 and to variable resistor or potentiometer $R_4$ and switching thyristor 25 to provide voltage signal K(A−D) which is then received by differentiating amplifier 26 which provides an output voltage signal corresponding to $$\frac{Kd(A - D)}{dt}$$

which is delivered to summer 28 which sums the two to provide output function signal $$(A - D) + \frac{Kd(A - D)}{dt}$$

which is received by actuator 30 which is operative to control the engagement of clutch assembly 32 in the manner prescribed by the function signal voltage.

In the electrical form, the clutch control system of the invention is preferably D.C. signal control which is delivered to a suitable D.C. motor operatively connected to the actuator.

Although not shown, the clutch control system of the invention may include filters, shapers and other components where the control system is electrical to provide the shape, amplitude and quality of function signal desired.

What is claimed is:

1. A clutch control system for controlling rate of engagement between a driven member of a clutch assembly and a driver member of an engine having an adjustable throttle, said system comprising, a first sensor member operative to provide a first signal corresponding to actual engine speed, a second sensor member operative to provide a second signal corresponding to a desired engine speed, and control means operative to receive said first and second signals and provide an output function signal therefrom to an actuator operative to effect the engagement upon receipt of the function signal, said function signal represented by the equation:

$$F = (A\text{-}D) + \frac{d(A\text{-}D)}{dt}$$

where:
D = desired engine speed
A = actual engine speed $$\frac{d(A-D)}{dt} = \text{rate of change of the difference between the actual and desired engine speeds with respect to time.}$$

2. The clutch control system of claim 1 wherein said control means includes means for providing at least one weighting factor for controlling the magnitude of at least one of said first and second signals.

3. The clutch control system of claims 1 or 2 wherein said control means includes means for providing at least one weighting factor for controlling at least one of the magnitudes of difference between said first and second signals and said difference differentiated with respect to time.

4. The clutch control system of claim 1, 2 or 3 wherein the control means includes means to modify said second signal in a predetermined manner.

5. The clutch control system of claim 4 wherein the predetermined manner is to modify the second signal in relationship to the clutch driven member speed.

6. The clutch control system of claim 4 wherein the predetermined manner is to modify the second signal in relationship to gear ratio engaged in a transmission connected to the clutch driven member.

7. The clutch control system of claim 4 wherein the predetermined manner is to modify the second signal in relationship to the difference between the actual engine speed and the clutch driven member speed.

8. The clutch control system of claim 4 wherein the predetermined manner is to modify the second signal in relationship to heat generated in the clutch.

9. The clutch control system of claim 4 wherein the predetermined manner is to modify the second signal in relationship to difference between actual engine speed and the clutch driven member speed times clutch torque indication integrated over time.

10. A clutch control system for controlling rate of engagement between a driven member of a clutch assembly and a driver member of an engine having an adjustable throttle, said system comprising:
a first sensor member operative to provide a first signal corresponding to actual engine speed,
a second sensor member operative to provide a second signal corresponding to a desired engine speed, and
being control means being operative to regulate the speed of rotation of the said driver member in a predetermined relation to the difference between said first signal and said second signal and the rate of change of the difference between said first signal and said second signal with respect to time.

11. The clutch control system of claim 10 wherein said control means includes means for providing at least one weighting factor for controlling the magnitude of at least one of said first and second signals.

12. The clutch control system of claims 10 or 11 wherein said control means includes means for providing at least one weighting factor for controlling at least one of the magnitudes of difference between said first and second signals and said difference differentiated with respect to time.

13. The clutch control system of claim 10 wherein the control means includes means to modify the second signal in a predetermined manner.

14. The clutch control system of claim 13 wherein the predetermined manner is to modify the second signal in response to the clutch driven member speed.

15. The clutch control system of claim 13 wherein the predetermined manner is to modify the second signal in response to a gear ratio engaged in a transmission connected to the clutch driven member.

16. The clutch control system of claim 13 wherein the predetermined manner is to modify the second signal in response to the difference between the actual engine speed and the clutch driven member speed.

17. The clutch control system of claim 13 wherein the predetermined manner is to modify the second signal in response to heat generated in the clutch.

18. The clutch control system of claim 13 wherein the predetermined manner is to modify the second signal in response to difference between the actual engine speed and the clutch driven member speed times clutch torque indication integrated over time.

19. A clutch control system for controlling rate of engagement between a driven member of a clutch assembly and a driver member of an engine having an adjustable throttle, said system comprising:
a sensor member operative to provide a signal corresponding to actual engine speed, and
control means being operative to regulate the speed of rotation of said driver member in relation to the difference between said actual engine speed and a desired engine speed and the rate of change of the difference between the actual engine speed and the desired engine speed with respect to time.

20. The clutch control system of claim 19 wherein said control means includes means for providing at least one weighting factor for controlling the magnitude of at least one of said first and second signals.

21. The clutch control system of claims 19 or 20 wherein said control means includes means for providing at least one weighting factor for controlling at least one of the magnitudes of difference between said first and second signals and said difference differentiated with respect to time.

22. The clutch control system of claim 19 wherein said control means includes means to modify said desired engine speed in a predetermined manner.

23. The clutch control system of claim 22 wherein the predetermined manner is to modify the desired engine speed in response to the clutch driven member speed.

24. The clutch control system of claim 22 wherein the predetermined manner is to modify the desired engine speed in response to a gear ratio engaged in a transmission connected to the clutch driven member.

25. The clutch control system of claim 22 wherein the predetermined manner is to modify the desired engine speed in response to the difference between the actual engine speed and the clutch driven member speed.

26. The clutch control system of claim 22 wherein the predetermined manner is to modify the desired engine speed in response to heat generated in the clutch.

27. The clutch control system of claim 22 wherein the predetermined manner is to modify the desired engine speed in response to difference between actual engine speed and the clutch driven member speed times clutch torque indication integrated over time.

28. A clutch control system for controlling rate of engagement between a driven member of a clutch assembly and a driver member of the clutch assembly, said system comprising:

a first sensor member operative to provide a first signal corresponding to actual speed of said driver member, and control means being operative to regulate the speed of rotation of said driver member in relation to the difference between said driver member actual speed and a driver member desired speed and in relation to the rate of change of the difference between said driver member actual speed and said driver member desired speed with respect to time.

29. The clutch control system of claim 28 wherein said driver member desired speed is varied by a manually operative control means.

30. The clutch control system of claim 28 wherein said control means is operative to provide a function signal therefrom to an actuator operative to effect the engagement, said function signal represented by the equation:

$$F = (A - D) + \frac{d(A - D)}{dt}$$

where:
D = desired driver member speed
A = actual driver member speed $\frac{d(A - D)}{dt}$ = rate of change of difference between actual and desired driver member speed with respect to time.

31. The clutch control system of claim 28 wherein said control means includes a second sensor member operative to provide a second signal corresponding to said driver member desired speed.

32. The clutch control system of claim 31 wherein said control means includes means for providing at least one weighting factor for controlling the magnitude of at least one of said first and second signals.

33. The clutch control system of claims 31 or 32 wherein said control means includes means for providing at least one weighting factor for controlling at least one of the magnitudes of difference between said first and second signals and said difference differentiated with respect to time.

34. The clutch control system of claim 25 wherein said control means includes means to modify said desired driver member speed in a predetermined manner.

35. The clutch control system of claim 34 wherein the predetermined manner is to modify the desired driver member speed in response to the driven member speed.

36. The clutch control system of claim 34 wherein the predetermined manner is to modify the desired driver member speed in response to a gear ratio engaged in a transmission connected to the clutch driven member.

37. The clutch control system of claim 34 wherein the predetermined manner is to modify the desired driver member speed in response to the difference between the driver member speed and the driven member speed.

38. The clutch control system of claim 34 wherein the predetermined manner is to modify the desired driver member speed in response to heat generated in the clutch.

39. The clutch control system of claim 34 wherein the predetermined manner is to modify the desired driver member speed in response to the difference between the driver member speed and the driven member speed times clutch torque indication integrated over time.

* * * * *